March 27, 1934.     J. A. COUNCILOR     1,952,972
COMBINED STATEMENT BLANK — CHECK FORM AND ENVELOPE
Filed June 1, 1933     2 Sheets—Sheet 1
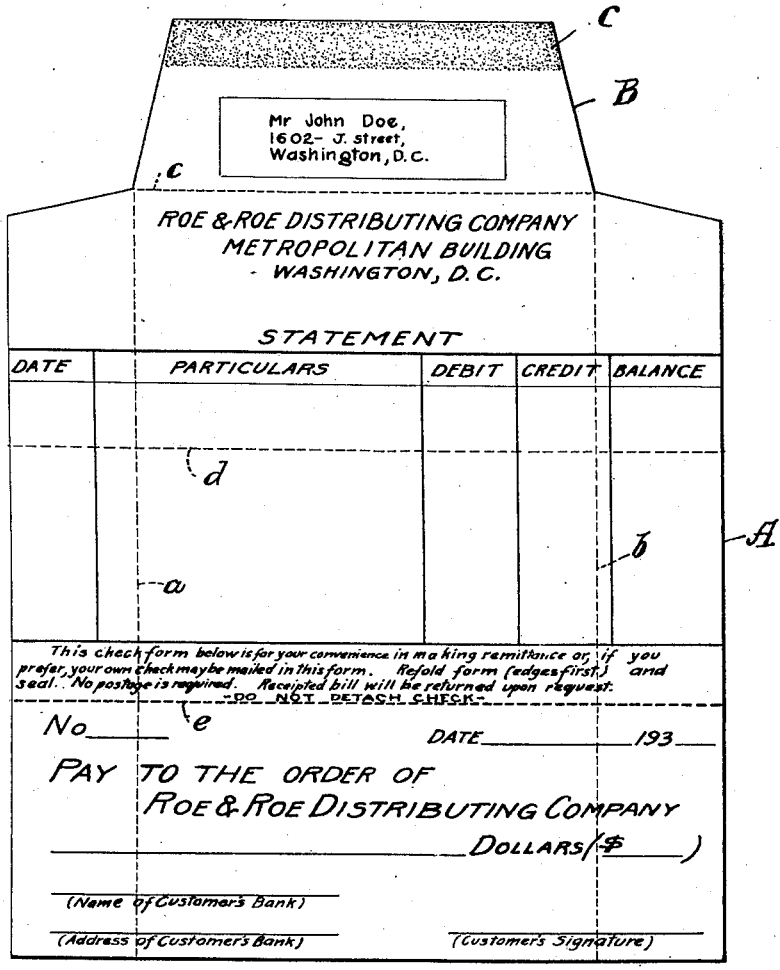
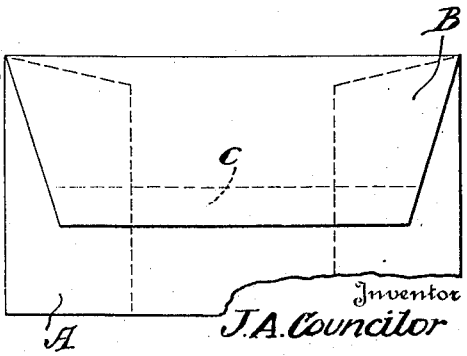
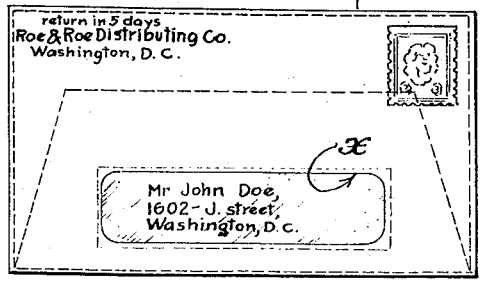

March 27, 1934. J. A. COUNCILOR 1,952,972
COMBINED STATEMENT BLANK—CHECK FORM AND ENVELOPE
Filed June 1, 1933 2 Sheets-Sheet 2
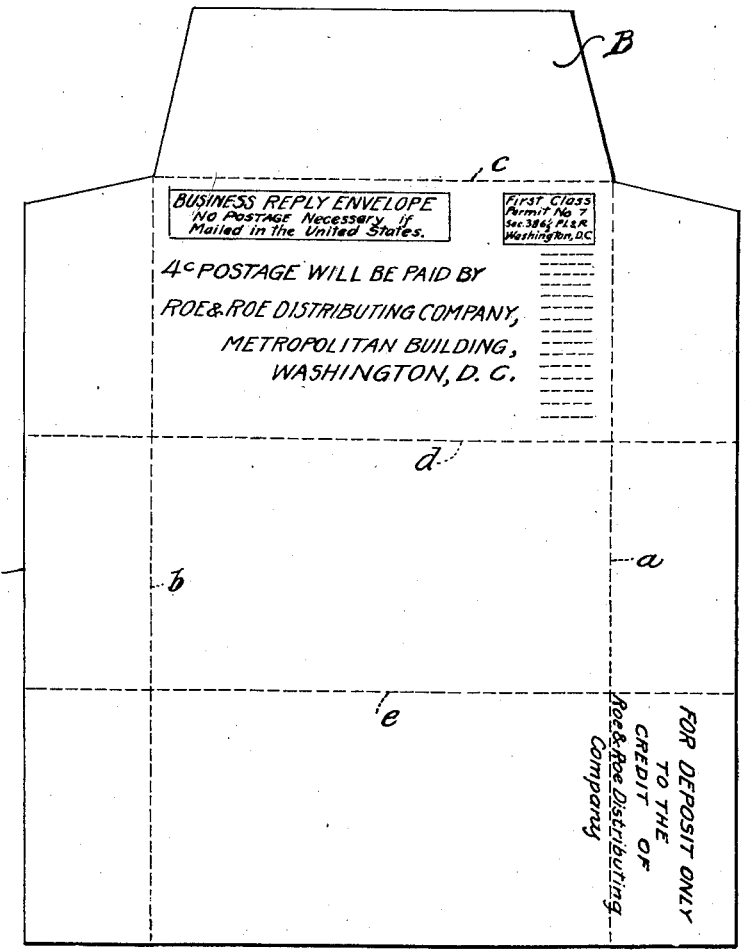
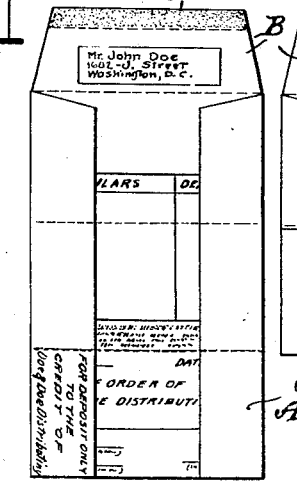
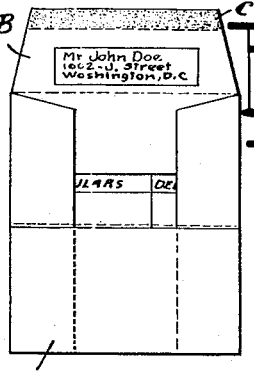
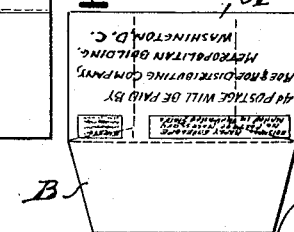
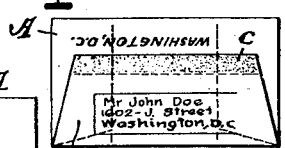
Inventor
J. A. Councilor
By
Attorneys Patented Mar. 27, 1934

1,952,972

UNITED STATES PATENT OFFICE 1,952,972

COMBINED STATEMENT BLANK—CHECK FORM AND ENVELOPE

James A. Councilor, Washington, D. C.

Application June 1, 1933, Serial No. 673,906

3 Claims. (Cl. 229—92.7)

This invention relates to a combined statement blank, check form and envelope, the object of which is to facilitate rendition of account statements, and lend encouragement to the payment thereof. Such statements are particularly useful in connection with the commercial transactions of installment houses for the purposes of maintenance of account and the rendering of monthly statements showing either balances or installment amounts due. It is to be understood, however, that the invention is not restricted to this field of use.

To this end, the invention consists of a sheet or blank, including a sealing flap section, having printed thereon the necessary form serving the creditor's purpose of statement of account and convenient check form by means of which the debtor may make payment by merely filling in the name of his bank, the amount, and his signature.

I am aware that it has been proposed heretofore to combine statement and check blanks or forms, as such, but these are usually employed in commercial transactions by the debtor merely for the purpose of identification of the remittance check which is transmitted in payment of or on account rendered. The object of the present invention, however, is widely different in that the blank and forms are so constructed and arranged as to advantageously serve both the creditor and debtor as a combined statement, remittance and mailing container.

By way of explanation, the statement may be prepared in full as to debit, credit and balance by the creditor and the blank so folded that the debtor's name on said statement serves as the mailing address when the statement is enclosed in a window envelope. The debtor upon receipt needs only fill out the check form, refold the blank as before except as to the sealing flap section which in this instance is simply reversed and sealed to the outer face of a pre-folded section, thereby forming an envelope having suitably printed thereon the necessary return address data and preferably prepaid postal or postal mailing permit. Since the debtor has at hand the check blank, the reply container, and prepaid postage, prompt settlement of account is much encouraged and facilitated, and considerable expense on the part of the creditor in the aggregate is eliminated as hereinafter set forth.

Other objects and advantages of the invention will be hereinafter set forth and the novel features thereof defined by the appended claims.

In the drawings:

Fig. 1 is a plan view of the blank forming the subject matter of this invention;

Fig. 2 is a view of the reverse side of said blank;

Figs. 3 to 6 are detail views showing the steps of folding of the blank to its mailing condition;

Fig. 7 is a view showing in dotted lines the blank in a window envelope ready for mailing to the debtor;

Fig. 8 is a view of the blank as refolded for return by the addressee to the sender;

Fig. 9 is a transverse section through the blank folded for transmission to the addressee, and Fig. 10 is a similar section in which the sealing flap is reversed for sealing the folded blank for return transmission.

Like reference characters designate corresponding parts in the several figures of the drawings.

Referring to the drawings, the blank or sheet A is of any suitable size which lends itself best for the purposes of the invention, but preferably of such size as may be used conveniently in standard ledger and file systems. The sheet may be retained in the individual files during the account period and from time to time the items may be entered thereon as the transactions occur. Book typewriting machines serve to best advantages in this adaptation, especially in view of the adaptability to duplication on the ledger sheets of well-known type.

The sheet A is cut at one end to form the sealing flap B which has a mucilage edge C at its top extremity. On the face of the sheet side or longitudinal fold lines $a$, $b$ may be indicated in any desired manner as by scoring, edge dots, or printed broken lines in the manner shown in the drawings. Likewise transverse fold lines $c$, $d$, $e$, are indicated.

Essentially, so far as the forms go, the sheet is divided upon its face into three sections, namely, the flap section at the top, the intermediate statement form section and the bottom check form section, but the transverse fold lines give the blank a four-section fold, which is important in carrying out the objects of the invention.

Describing these sections more in detail, it will be noted in Fig. 1 that the flap section bears the name and address of the debtor so arranged as to be at the proper position to appear at the window $x$ of a window envelope $y$. As will be later shown, when the blank is returned in envelope form the addressee notation just referred to is hidden under the flap.

The statement section may contain any desired data and form and I do not wish to be in any wise restricted as to this feature. Preferably, however, at the top the creditor's name and address appears and beneath that a columnar arrangement for items, debits, credits, and balance is printed.

Below said statement section is arranged the check form. The amount of the check, the name of debtor's bank and signature are substantially all that is required to be filled in by the debtor before the blank is in condition to be returned to the creditor. Preferably this check form has printed across the back of the section, as shown in Fig. 2, the necessary legend for a deposit endorsement by the creditor so as to render the check non-negotiable in the event the blank should go astray or be stolen.

Upon this reverse side of the blank, the upper section adjacent the flap has printed thereon the return address of the sender together with the usual return postage permit stamp.

It will be apparent from the foregoing description that the debtor has a very convenient means in hand to enable settlement of account which is fully stated. Check and return postage being supplied it is a simple process to make the return.

In order that it may be clear a description of the use of this invention will now be given. The creditor first applies to the flap section the name and address of the debtor and fills in the statement of account in the usual manner. The blank is now in condition to be folded and the first step is shown in Fig. 3 wherein the side flaps are folded over. The next step involves the folding of the check section at the bottom upon the intermediate section as shown in Fig. 4. Optionally, however, the check section may be folded first and then the side flaps. The third step is shown in Fig. 5 wherein another fold is made of the two sections above mentioned upon the top section. This leaves the sealing flap section to be folded backwardly as shown in Fig. 6 exposing the name and address of the debtor and in this folded condition the blank is slipped into a window envelope y as shown in Fig. 7. The creditor now mails this enclosure to the debtor who upon receipt checks the correctness of the statement, fills in the blanks of the check and refolds the blank in exactly the same manner as described excepting that in this instance the sealing flap is folded in the reverse direction as shown in Figs. 8 and 10 to seal the blank in an envelope form. The mucilage edge is attached to the outer face of the intermediate section of the blank and not to the check section which is of course folded within the other two sections. Since the address of the sender is already printed upon the outer face of the top section and prepaid postage arranged for, the debtor simply has to drop the article into the mail for transmission.

While the specific details of construction have been herein shown and described, the invention is not confined thereto as alterations may be made without departing from the spirit thereof as defined by the appended claims.

Having thus described my invention what I claim as new and desire to secure by Letters Patent is:

1. A blank of the class described comprising a plurality of foldable sections including a check section and a sealing flap section adapted to bear upon its inner face the name and address of the addressee in position to be presented at the window of a window envelope when the flap is turned backwardly against the adjacent folded section, one of said folded sections upon its reverse side bearing the sender's name and address for return purposes, said flap section having a mucilaged edge adapted to be sealed to the outer face of one of said foldable sections other than that bearing the sender's name and address when the flap is reversed from the sending position aforesaid, to thereby form a mailing envelope.

2. A combined statement check blank and envelope comprising upper, intermediate and check sections, and a flap section having a sealing edge, said flap section when folded in one direction constituting a primary mailing direction and when folded in the reverse direction constituting means for sealing the blank in envelope form with the check securely enclosed therewithin.

3. A blank of the class described comprising a body portion having a foldable statement section and a check form section, said body portion having side flaps adapted when folded over the sections aforesaid to form an envelope, said body portion also having a sealing flap section foldable in one direction to present mailing direction and reversely foldable for sealing against the statement section of the body portion when the latter is folded into envelope form.

JAMES A. COUNCILOR.